United States Patent [19]

Broaddus et al.

[11] 3,954,142
[45] May 4, 1976

[54] ZONAL FRACTURE TREATMENT OF WELL FORMATIONS

[75] Inventors: Gene C. Broaddus; Sherman E. Fredrickson, both of Duncan, Okla.

[73] Assignee: Halliburton Company, Duncan, Okla.

[22] Filed: Aug. 21, 1974

[21] Appl. No.: 499,241

[52] U.S. Cl. .................. 166/307; 166/308
[51] Int. Cl.² ............ E21B 43/26; E21B 43/27
[58] Field of Search .......... 166/273, 274, 275, 307, 166/282, 308, 271, 259, 283

[56] References Cited
UNITED STATES PATENTS

| | | | |
|---|---|---|---|
| 3,003,554 | 10/1961 | Craig, Jr. et al. | 166/274 |
| 3,131,759 | 5/1964 | Slusser | 166/305 R |
| 3,160,207 | 12/1964 | McEver | 166/307 |
| 3,294,765 | 12/1966 | Hort et al. | 166/307 |
| 3,550,686 | 12/1970 | Knox | 166/307 |
| 3,568,772 | 3/1971 | Geogarty | 166/274 |
| 3,642,068 | 2/1972 | Fitch et al. | 166/308 X |
| 3,768,564 | 10/1973 | Knox et al. | 166/307 |
| 3,781,203 | 12/1973 | Clark | 166/307 |
| 3,819,520 | 6/1974 | Jones | 166/307 |
| 3,847,224 | 11/1974 | Allen et al. | 166/274 |

OTHER PUBLICATIONS

Frick et al., "Petroleum Production Handbook," Vol. II, McGraw-Hill Book Co., Inc., New York, 1962, pp. 18-3 and 18-12 relied on.

*Primary Examiner*—Stephen J. Novosad
*Attorney, Agent, or Firm*—Thomas R. Weaver; C. Clark Dougherty, Jr.; John H. Tregoning

[57] ABSTRACT

Methods are provided for treating an underground well formation whereby the treatment is confined to a desired zone within the formation. The methods comprise introducing one or more preflush fluids into one or more fractures in the formation followed by the introduction of a treating fluid having a density differing sufficiently from the density of the preflush fluids whereby the treating fluid is segregated and caused to flow into a desired zone within the formation.

15 Claims, 12 Drawing Figures

ZONAL FRACTURE TREATMENT OF WELL FORMATIONS

The present invention relates to the zonal fracture treatment of well formations, and more particularly, but not by way of limitation, to an improved method of fracture treating underground well formations whereby the treatment is confined to a desired zone within the formations.

Many various methods have been developed and used for increasing or stimulating the production of oil, gas and the like from an underground well formation penetrated by a well bore. One commonly used method of well stimulation where the producing formation to be stimulated is formed of relatively low permeability material consists of exerting fluid pressure on the formation to create one or more fractures therein and then extending the created fractures outwardly from the well bore. After the fractures have been created and extended, a propping agent such as sand, glass beads, etc., can be placed therein to maintain the fractures open after fluid pressure on the formation is withdrawn and the fractures close.

Another commonly used well stimulation method involves a technique known in the art as fracture acidizing which consists of creating and extending one or more fractures in a well formation and then etching the fracture faces with acid so that when the formation is returned to production and the fractures close, flow channels remain therein through which desired fluids contained in the formation flow to the well bore.

In fracture treatment procedures used heretofore, less than desired results have often been achieved due to the fractures extending into undesirable zones in the formation. While most wells are completed in the zone of best possible production, it is often difficult to prevent a created fracture from extending vertically above or below the desired zone or both, resulting in increased production of unwanted fluids or gases. For example, barren zones or zones producing excessive water or undesirable gases may lie in close proximity to a preferred production zone and when a fracture treatment procedure is carried out to stimulate production from the preferred zone, flow channels extending into the undesirable zones are simultaneously created causing an undesirable increase in the flow of gases or water therefrom as well as a desirable increase in the production of oil or gas from the preferred zone.

By the present invention an improved method of treating a well formation is provided wherein the treatment is confined to a desired zone within the formation. While the invention is particularly suitable for carrying out fracture acidizing treatments of well formations to increase the production of desired fluids therefrom, it will be readily understood by those skilled in the art that the invention can be utilized for carrying out a variety of fracture related treatments in well formations such as the placement of propping agents in a particular zone, etc.

The present invention broadly comprises treating an underground well formation containing one or more fractures so that the treatment is confined to a desired zone within the fractures comprising the steps of first introducing a preflush fluid into the fracture or fractures and then introducing a treating fluid therein, the treating fluid having a density differing sufficiently from the density of the preflush fluid whereby the treating fluid is segregated and caused to flow into a desired zone within the fracture or fractures by the preflush fluid.

The methods of the present invention can be carried out in formations including natural fractures or in formations wherein artificial fractures are created therein and extended by exerting fluid pressure thereon. Further, where fractures are induced in a formation, the preflush fluids of the present invention can be utilized as the fracturing fluid for creating the fractures and the fractures can be extended simultaneously with the carrying out of the treatment methods.

In the accompanying drawings forming a part of this disclosure:

In treating underground well formations penetrated by well bores, particularly those formed of relatively impermeable and fracturable materials, it has become common practice to induce fractures in the most productive zone of such formations and extend the fractures laterally outwardly from the well bore whereby desired fluids contained in the formation more freely flow from the formation into the well bore. In most formations, induced fractures are vertically oriented, i.e., the fracture or fractures produced lie in a substantially vertical plane paralleling the axis of the well bore. The induction of such fractures is generally accomplished by pumping a fracturing fluid through the well bore into the formation thereby exerting hydraulic pressure on the formation at a point in the most productive and desired zone of the formation. Once parting of the formation is achieved, continued pumping of the fracturing fluid at high pressures into the formation extends the fracture or fractures outwardly from the well bore. However, in addition to extending the fractures outwardly, they are often also extended or enlarged in directions upwardly or downwardly, or both, from the point of initiation. If undesirable zones lie above or below the desired zone, and if during the fracture treatment of the desired zone conductive fractures are also formed into the adjacent undesirable zones, fluids from the undesirable zones are produced along with fluids from the desired zone into the well bore. For example, zones containing excessive quantities of water or unwanted gas can lie adjacent oil producing zones and stimulation of the production of water and unwanted gas with the oil is an undesirable result.

The present invention provides methods of fracture treating underground well formations utilizing a treating fluid whereby the treating fluid is confined to a desired zone within fractures in the formation, and as a result, the effects of the treatment do not reach undesirable zones. While as stated above, the methods of the present invention can be adapted for carrying out a variety of treatments or procedures in well formations, they are particularly well adapted for carrying out fracture acidizing procedures whereby high capacity flow channels are formed in a formation.

Figure 1:
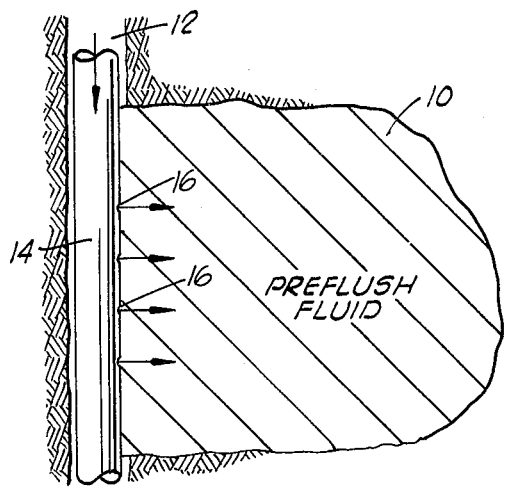
FIG. 1 is a schematic illustration of a fracture in an underground well formation after a preflush fluid of the present invention has been introduced therein.
Figure 2:
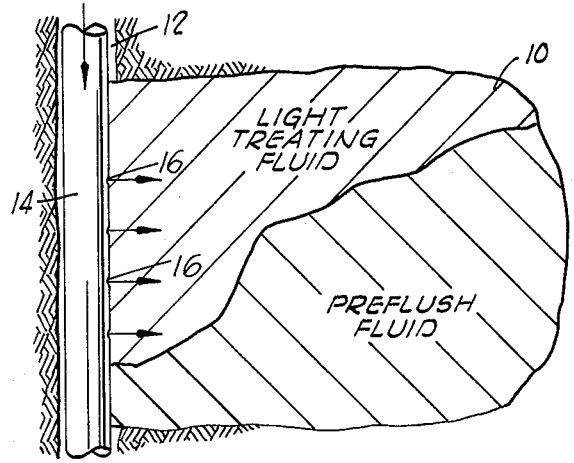
FIG. 2 is a schematic illustration of the fracture of FIG. 1 after a light treating fluid of the present invention has been introduced therein.
Figure 3:
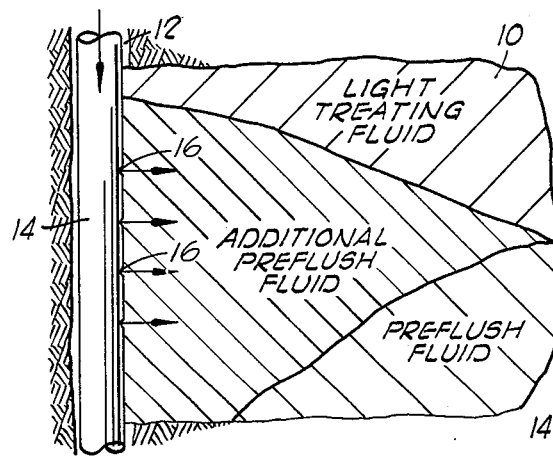
FIG. 3 is a schematic illustration of the fracture of FIG. 1 after additional preflush fluid has been introduced therein.
Figure 4:
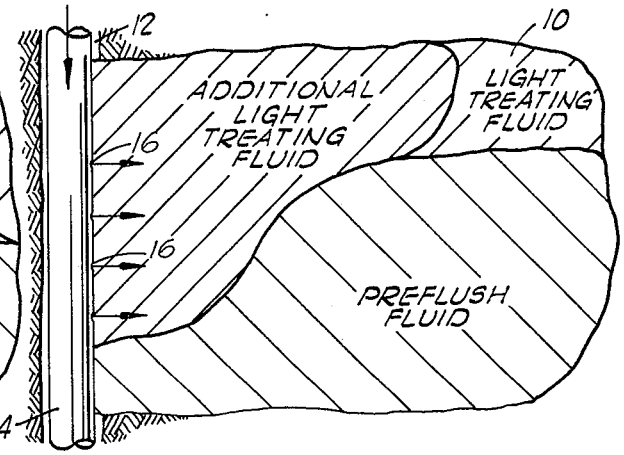
FIG. 4 is a schematic illustration of the fracture of FIG. 1 after additional light treating fluid has been introduced therein.

Referring now to the drawings and particularly to FIGS. 1 through 4, a vertical fracture 10 in an underground well formation is schematically illustrated extending laterally outwardly from a well bore 12 penetrating the formation. A casing or liner 14 is shown positioned in the well bore 12 having perforations 16 disposed therein positioned adjacent a desirable production zone of the formation. The fracture 10 can be natural or induced, and in either case, a preflush fluid is introduced into the fracture by pumping the fluid under pressure through the conduit 14 into the fracture by way of the perforations 16. As will be understood, if the fracture 10 is induced, the preflush fluid can be utilized for inducing the fracture. Assuming that an undesirable zone lies directly below the zone in which it is desired to carry out a treatment utilizing a treating fluid, in accordance with the present invention, a treating fluid having a density differing sufficiently from the density of the preflush fluid is utilized whereby the treating fluid is segregated and caused to flow into the desired upper zone by the preflush fluid as shown in FIG. 2. After pumping the preflush fluid into the fracture 10 in an amount at least sufficient to fill the lower portion thereof, the light or less dense treating fluid is introduced into the fracture 10. Due to the density difference between the treating fluid and the preflush fluid, the lighter treating fluid overrides the preflush fluid and is segregated into the top portion of the fracture. After the light treating fluid has been pumped into the fracture in a quantity sufficient to fill the top portion and extend the fracture, additional preflush fluid is introduced into the fracture in order to maintain the treating fluid in the upper desired zone as shown in FIG. 3. After the additional preflush fluid has been introduced into the fracture, additional treating fluid is introduced therein which is also maintained in the desired upper zone as shown in FIG. 4 by overriding the preflush fluid. Successive quantities of preflush fluid and treating fluid can be continuously introduced into the fracture 10 while applying sufficient hydraulic pressure to maintain the fracture in an open position thereby forcing the treating fluid outwardly in the fracture from the well bore 12 extending the fracture and simultaneously treating the desired zone therewithin.

Figure 5:
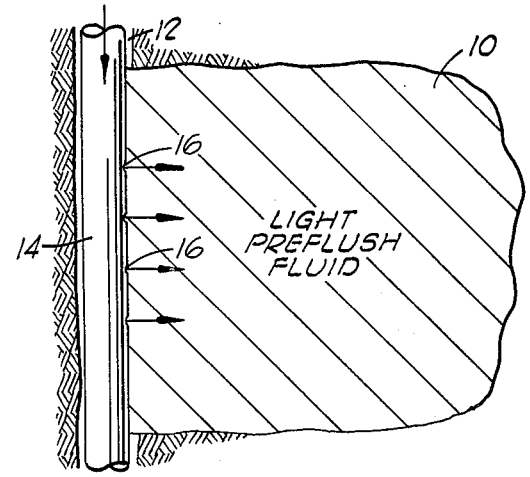
FIG. 5 is a schematic illustration of a fracture in an underground well formation after a preflush fluid of the present invention has been introduced therein.
Figure 6:
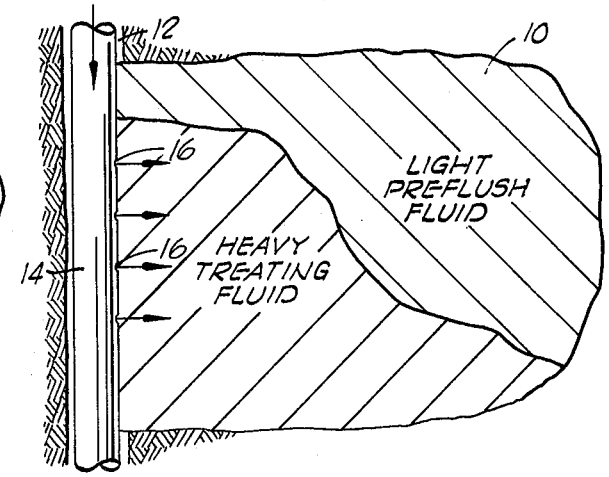
FIG. 6 is a schematic illustration of the fracture of FIG. 5 after a heavy treating fluid of the present invention has been introduced therein.

Referring now to FIGS. 5 and 6, when it is desired to treat a lower zone in a formation and prevent upper portions of a fracture therein from receiving treating fluid, a light preflush fluid is introduced into the fracture as shown in FIG. 5. After introduction of the preflush fluid, a treating fluid having a density greater than the density of the preflush fluid whereby the treating fluid is segregated and caused to flow into the lower zone in the fracture by the preflush fluid is introduced into the fracture as shown in FIG. 6. Additional quantities of light preflush fluid and heavy treating fluid can be successively introduced into the fracture while maintaining the fracture open so that the treating fluid is confined to the desired lower zone therein and caused to flow through the fracture as the fracture is extended.

Figure 7:
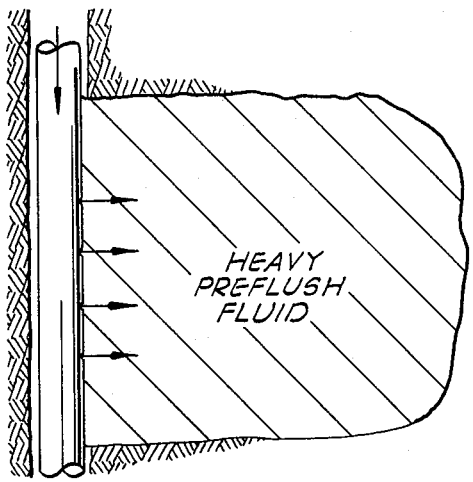
FIG. 7 is a schematic illustration of a fracture in an underground well formation after a heavy preflush fluid of the present invention has been introduced therein.
Figure 8:
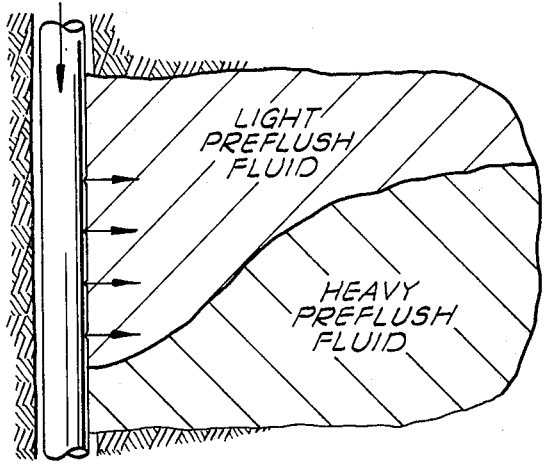
FIG. 8 is a schematic illustration of the fracture of FIG. 7 after a light preflush fluid of the present invention has been introduced therein.
Figure 9:
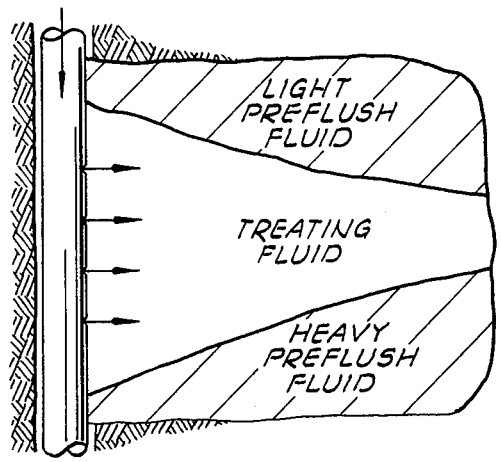
FIG. 9 is a schematic illustration of the fracture of FIG. 7 after a treating fluid of the present invention has been introduced therein.

Referring now to FIGS. 7 through 12, when it is desired to confine a treating fluid to an intermediate zone of a formation penetrated by a fracture, i.e., prevent the treating fluid from entering the uppermost or lowermost portions of the fracture which may extend into undesirable zones, a heavy preflush fluid is first introduced into the fracture as shown in FIG. 7. After introduction of the heavy preflush fluid in an amount at least sufficient to fill the lower portion of the fracture, a light preflush fluid having a density differing sufficiently from the density of the heavy preflush fluid so that the light preflush fluid is segregated into the upper portion of the fracture along an interface is introduced into the fracture as shown in FIG. 8. After placement of the light and heavy preflush fluids in the fracture, a treating fluid is introduced therein having a density substantially intermediate to the densities of the light and heavy preflush fluids whereby the treating fluid is segregated and caused to flow along the interface between the light and heavy preflush fluids in the desired treating zone as shown in FIG. 9.

Figure 10:
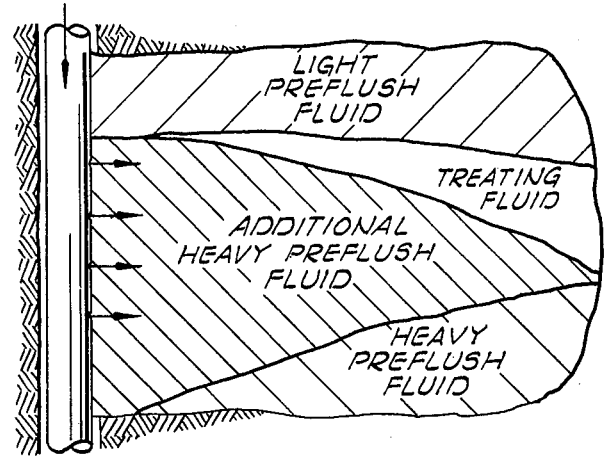
FIG. 10 is a schematic illustration of the fracture of FIG. 7 after additional heavy preflush fluid has been introduced therein.
Figure 11:
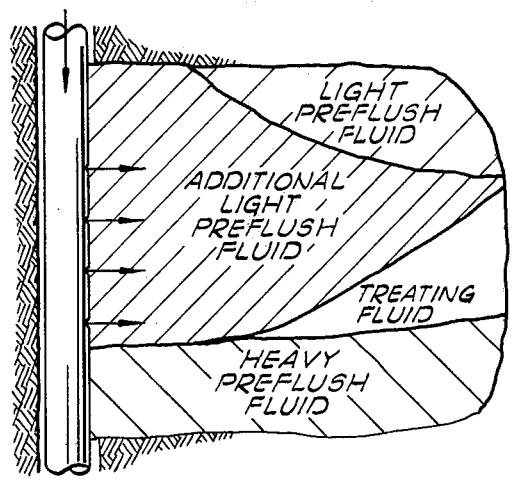
FIG. 11 is a schematic illustration of the fracture of FIG. 7 after additional light preflush fluid has been introduced therein.
Figure 12:
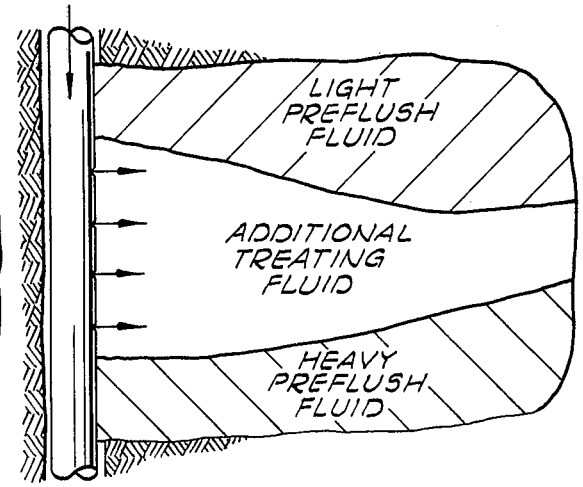
FIG. 12 is a schematic illustration of the fracture of FIG. 7 after additional treating fluid has been introduced therein.

As shown in FIGS. 10 through 12, additional quantities of heavy preflush fluid, light preflush fluid and treating fluid can be successively introduced into the fracture thereby maintaining the segregation of the treating fluid in the desired zone as the fracture is extended.

Thus, in accordance with the methods of the present invention, the densities of preflush fluids and treating fluids utilized are controlled to cause separation and segregation of the treating fluid into a desired zone within a fracture. While any of a variety of fluids can be utilized in carrying out the methods of the present invention, hydrocarbon liquids, water, and aqueous solutions are preferred because of their availability and general compatibility with well formations.

In order to achieve separation and segregation between the fluids used, the densities thereof must be such that a difference in the specific gravities of the fluids of at least about 0.025 exists at the conditions existing in the well formation to be treated. Preferably, fluids are utilized having a specific gravity difference of about 0.10 at the conditions in the formation which creates a pronounced vertical movement of one fluid with respect to the other. In treatments where an extreme overriding or underriding of one fluid with respect to another is required, a specific gravity difference of 0.20 between the fluids is preferred. To create the above mentioned difference of 0.025 between specific gravities of fluids in the situation where it is desired that the treating fluid can be confined to an intermediate zone of a fracture, as described in connection with FIGS. 7 through 12, it is necessary that the minimum difference between the specific gravities of the heavy preflush fluid and the light preflush fluid be at least about 0.05. Accordingly, in these situations, the difference between the specific gravities of the heavy preflush fluid and the light preflush fluid is equal to the sum of the differences between the heavy preflush fluid and the treating fluid and the treating fluid and the light preflush fluid. In this connection, reference should be made to Table III, below, where the differences between the specific gravities of the heavy preflush fluids and the light preflush fluids can be readily observed. As will be understood, the greater the difference in density between the fluids, the more pronounced will be the overrunning or underrunning result.

High viscosity fluids tend to move through a fracture in a well formation as a mass with less tendency to be affected by differing densities than low viscosity fluids. Low viscosity fluids on the other hand readily override and underride fluids of differing density. Therefore, preflush and treating fluids having apparent viscosities of less than about 100 cps at the temperatures existing in the fractures into which they are to be introduced are generally preferred for use in accordance with this invention. However, higher viscosity treating and preflush fluids can be used if the circumstances dictate and overriding or underriding can be accentuated by utilizing fluids of differing viscosity. More specifically, the segregation and separation of the preflush and treating fluids can be enhanced by using a preflush fluid having a higher viscosity than the treating fluid. Preferably, when preflush and treating fluids of different viscosity are used, the preflush fluid viscosity is in the range of from about 5 to about 80 times the viscosity of the treating fluid.

The most preferred light preflush fluids for use in accordance with this invention are oil, kerosene, or water. Most preferred heavy preflush fluids are aqueous sodium chloride solutions, aqueous calcium chloride solutions, and aqueous potassium chloride solutions. The most preferred treating fluids are those in the form of aqueous solutions.

Specific preferred aqueous preflush fluids for fracture acidizing are solutions ranging in specific gravity from about 1.0 to about 1.4 at room temperature (room temperature is used herein to mean a temperature in the range of from about 15° C to about 20°C). Aqueous acid solutions having specific gravities in the range of from about 1.02 to about 1.34 at room temperature are particularly suitable for use with the preflush fluids. Aqueous solutions of hydrochloric acid and hydrochloric acid-organic acid mixtures, e.g., hydrochloric-acetic acid mixtures are most preferred for carrying out fracture acidizing procedures, but alcohol-hydrochloric acid solutions are also suitable in cases where an extra light acid treating fluid is required.

In carrying out fracture acidizing procedures to stimulate production from a desired zone within a formation using the methods of the present invention, hydrocarbon liquids, water or aqueous solutions are particularly suitable and are preferred for use as preflush fluids. Any of a variety of acidizing treating fluids can be utilized, but aqueous hydrochloric acid solutions, aqueous solutions of hydrochloric-organic acid mixtures and alcohol-hydrochloric acid solutions are particularly suitable and are preferred.

As stated above, successive quantities of preflush fluid and acid treating fluid can be continuously pumped or otherwise introduced into a fracture to extend the fracture while maintaining the acid segregated in a desired zone therein.

As is well understood by those skilled in the art, the acid is moved through the fracture while the fracture is maintained in an open position by fluid pressure exerted thereon so that the fracture is extended and channels are etched in the faces of the fracture by the reaction of the acid therewith. When the fractures have been extended to the desired extent and the acid has become spent, the fluid pressure exerted on the formation is withdrawn causing the fractures to close, but high capacity flow channels remain therein.

As the acid treating fluid reacts with the material forming the fracture faces, it increases in density. This density change must be taken into consideration when calculating the required densities of preflush fluids used.

When a single preflush fluid is used in carrying out a fracture acidizing treatment, the use of equal quantities of acid generally achieves satisfactory results. When two preflush fluids of differing density are used, equal quantities of the preflush fluids and acid can generally be used.

A variety of conventional additives can be incorporated with the preflush and treating fluids utilized to vary their physical characteristics, e.g., fluid loss additives, viscosity increasing agents, wetting agents, etc.

In order to more clearly illustrate the present invention in carrying out fracture acidizing procedures, the following examples are presented.

EXAMPLE 1

In applications where it is desired to confine an acid treating fluid to an upper zone in a fractured formation, i.e., the acid must override the preflush fluid, the acid used should preferably be at least about 0.8 pounds per gallon less dense than the preflush fluid used at room temperature, or stated another way, the acid should have a specific gravity less than the preflush fluid by at least about 0.10.

In Table I below the minimum required preflush fluid densities for various hydrochloric acid treating solutions are given:

TABLE I

| | MINIMUM PREFLUSH FLUID DENSITIES REQUIRED FOR TREATING AN UPPER ZONE WITH VARIOUS HYDROCHLORIC ACID SOLUTIONS | | | | |
|---|---|---|---|---|---|
| Acid Treating Fluid To Be Used | Acid Strength, By Weight | Acid Treating Fluid Specific Gravity | Acid Treating Fluid Density, Pounds Per Gallon | Preflush Fluid Specific Gravity | Preflush Fluid Density, Pounds Per Gallon |
| Aqueous Hydrochloric Acid Solution | 15% | 1.075 | 8.95 | 1.17 | 9.75 |
| Aqueous Hydrochloric Acid Solution | 20% | 1.1 | 9.17 | 1.2 | 10.0 |

TABLE I-continued

MINIMUM PREFLUSH FLUID DENSITIES REQUIRED FOR TREATING AN UPPER ZONE WITH VARIOUS HYDROCHLORIC ACID SOLUTIONS

| Acid Treating Fluid To Be Used | Acid Strength, By Weight | Acid Treating Fluid Specific Gravity | Acid Treating Fluid Density, Pounds Per Gallon | Preflush Fluid Specific Gravity | Preflush Fluid Density, Pounds Per Gallon |
|---|---|---|---|---|---|
| Aqueous Hydrochloric Acid Solution | 25% | 1.127 | 9.39 | 1.25 | 10.42 |
| Aqueous Hydrochloric Acid Solution | 28% | 1.14 | 9.5 | 1.3 | 10.83 |
| Methanol-Hydrochloric Acid Solution | 22.4% | 1.04 | 8.67 | 1.2 | 10.0 |

EXAMPLE 2

In applications where it is required that an acid treating fluid be confined to a lower zone in a fractured formation, i.e., the acid must underride the preflush fluid, the acid used should preferably be at least about 0.32 pounds per gallon greater in density than the preflush fluid at room temperature, or stated another way, the acid should have a specific gravity greater than the preflush fluid by at least about 0.04.

Table II below presents the preflush fluid densities which are preferred for use with various hydrochloric acid treating solutions.

EXAMPLE 3

In applications where it is required that an acid treating fluid be confined to an intermediate zone in a fractured formation, i.e., the acid must override the heavy preflush fluid used and underride the light preflush fluid used, the acid should preferably be at least about 0.8 pounds per gallon less dense than the heavy preflush fluid and at least about 0.32 pounds per gallon more dense than the light preflush fluid used.

Table III below presents the light and heavy preflush fluid densities which are preferred for use with various hydrochloric acid solutions.

TABLE II

PREFLUSH FLUID DENSITIES FOR TREATING A LOWER ZONE WITH VARIOUS HYDROCHLORIC ACID SOLUTIONS

| Acid Treating Fluid To Be Used | Acid Strength, By Weight | Acid Treating Fluid Specific Gravity | Acid Treating Fluid Density, Pounds Per Gallon | Preflush Fluid Specific Gravity | Preflush Fluid Density, Pounds Per Gallon |
|---|---|---|---|---|---|
| Aqueous Hydrochloric Acid Solution | 15% | 1.075 | 8.95 | 1.0 | 8.3 |
| Aqueous Hydrochloric Acid Solution | 20% | 1.1 | 9.17 | 1.0 | 8.3 |
| Aqueous Hydrochloric Acid Solution | 25% | 1.127 | 9.39 | 1.0 | 8.3 |
| Aqueous Hydrochloric Acid Solution | 28% | 1.14 | 9.5 | 1.0 | 8.3 |
| Methanol-Hydrochloric Acid Solution | 22.4% | 1.04 | 8.67 | 0.8 | 6.7 |

TABLE III

LIGHT AND HEAVY PREFLUSH FLUID DENSITIES FOR TREATING AN INTERMEDIATE ZONE WITH VARIOUS HYDROCHLORIC ACID SOLUTIONS

| Acid Treating Fluid To Be Used | Acid Strength, By Weight | Acid Treating Fluid Specific Gravity | Acid Treating Fluid Density, Pounds Per Gallon | Heavy Preflush Fluid Specific Gravity | Heavy Preflush Fluid Density, Pounds Per Gallon | Light Preflush Fluid Specific Gravity | Light Preflush Fluid Density, Pounds Per Gallon |
|---|---|---|---|---|---|---|---|
| Aqueous Hydrochloric Acid Solution | 15% | 1.075 | 8.95 | 1.17 | 9.75 | 1.0 | 8.3 |
| Aqueous Hydrochloric Acid Solution | 20% | 1.1 | 9.17 | 1.2 | 10.0 | 1.0 | 8.3 |
| Aqueous Hydrochloric Acid Solution | 25% | 1.127 | 9.39 | 1.25 | 10.42 | 1.0 | 8.3 |
| Aqueous Hydrochloric Acid Solution | 28% | 1.14 | 9.5 | 1.30 | 10.83 | 1.0 | 8.3 |
| Methanol-Hydrochloric Acid Solution | 22.4% | 1.04 | 8.67 | 1.20 | 10.0 | 0.8 | 6.7 |

In Table IV below the densities at room temperature of various preferred preflush acid treating fluids are given:

TABLE IV

DENSITIES OF VARIOUS PREFLUSH AND ACID TREATING FLUIDS

| Fluid | Concentration, By Weight | Condition | Specific Gravity | Density, Pounds Per Gallon |
|---|---|---|---|---|
| Aqueous Hydrochloric | | | | |

TABLE IV-continued
DENSITIES OF VARIOUS PREFLUSH AND ACID TREATING FLUIDS

| Fluid | Concentration, By Weight | Condition | Specific Gravity | Density, Pounds Per Gallon |
|---|---|---|---|---|
| Aqueous Hydrochloric Acid Solution | 5% | Live | 1.025 | 8.50 |
| Aqueous Hydrochloric Acid Solution | 10% | Live | 1.050 | 8.75 |
| Aqueous Hydrochloric Acid Solution | 15% | Live | 1.075 | 8.96 |
| Aqueous Hydrochloric Acid Solution | 15% | ¼ Spent | 1.1 | 9.17 |
| Aqueous Hydrochloric Acid Solution | 15% | ½ Spent | 1.125 | 9.38 |
| Aqueous Hydrochloric Acid Solution | 15% | ¾ Spent | 1.15 | 9.59 |
| Aqueous Hydrochloric Acid Solution | 15% | Spent | 1.175 | 9.79 |
| Aqueous Hydrochloric Acid Solution | 20% | Live | 1.1 | 9.17 |
| Aqueous Hydrochloric Acid Solution | 20% | Spent | 1.233 | 10.28 |
| Aqueous Hydrochloric Acid Solution | 25% | Live | 1.127 | 9.39 |
| Aqueous Hydrochloric Acid Solution | 25% | Spent | 1.295 | 10.79 |
| Aqueous Hydrochloric Acid Solution | 28% | Live | 1.14 | 9.5 |
| Aqueous Hydrochloric Acid Solution | 28% | ¼ Spent | 1.19 | 9.9 |
| Aqueous Hydrochloric Acid Solution | 28% | ½ Spent | 1.24 | 10.34 |
| Aqueous Hydrochloric Acid Solution | 28% | ¾ Spent | 1.29 | 10.75 |
| Aqueous Hydrochloric Acid Solution | 28% | Spent | 1.34 | 8.67 |
| Methanol-Hydrochloric Acid Solution | 22.4% | Live | 1.04 | 8.67 |
| Water | — | Fresh | 1.0 | 8.3 |
| Aqueous Potassium Chloride Solution | 2% | — | 1.011 | 8.44 |
| Aqueous Sodium Chloride Solution | 2% | — | 1.012 | 8.45 |
| Aqueous Sodium Chloride Solution | 5% | — | 1.034 | 8.63 |
| Aqueous Sodium Chloride Solution | 10% | — | 1.07 | 8.93 |
| Aqueous Sodium Chloride Solution | 15% | — | 1.11 | 9.25 |
| Aqueous Sodium Chloride Solution | 20% | — | 1.15 | 9.58 |
| Aqueous Sodium Chloride Solution | 26% | — | 1.2 | 10.0 |
| Aqueous Calcium Chloride Solution | Saturated | — | 1.4 | 11.6 |

It will be apparent from the foregoing that many widely different embodiments of this invention may be made without departing from the spirit and the scope thereof and the invention should be limited only by the lawful scope of the appended claims.

We claim:

1. A method for placing an acidic treating fluid into a desired zone of a fracture in an underground well formation comprising:
   introducing a preflush fluid having a known specific gravity into said fracture, and thereafter
   introducing an acidic treating fluid having a specific gravity not equal to the specific gravity of said preflush fluid into said fracture, the specific gravity of said acidic treating fluid being at least about 0.1 less than the specific gravity of said preflush fluid; whereby said acidic treating fluid having a lower specific gravity than said preflush fluid is caused to override said preflush fluid into a desired upper zone of said fracture.

2. The method of claim 1 wherein said preflush fluid is selected from the group consisting of hydrocarbon liquids, water, aqueous sodium chloride solutions, aqueous calcium chloride solutions, and aqueous potassium chloride solutions.

3. The method of claim 2 wherein said acidic treating fluid is selected from the group consisting of hydrochloric acid, hydrochloric acid-organic acid mixtures and methanol-hydrochloric acid mixtures.

4. The method of claim 1 which is further characterized to include the additional step of:
   continuously introducing successive quantities of said preflush fluid and said acidic treating fluid into said fracture so that the overriding of said acidic treating fluid into said upper zone is maintained while said acidic treating fluid is flowed through said fracture.

5. The method of claim 4 wherein the apparent viscosities of said preflush fluid and said acidic treating fluid at the temperature existing in said fractures are less than about 100 cps.

6. The method of claim 4 wherein said acidic treating fluid has a specific gravity in the range of from about 1.02 to about 1.34 at room temperature.

7. The method of claim 1 which is further characterized to include the initial step of inducing one or more of said fractures.

8. A method for placing a treating fluid into a desired zone of a fracture in an underground well formation comprising:

introducing a first preflush fluid having a known specific gravity into said fracture, introducing a second preflush fluid into said fracture, said second preflush fluid having a specific gravity sufficiently lower than the specific gravity of said first preflush fluid so that said second preflush fluid overrides said first preflush fluid, producing an interface between said first preflush fluid and said second preflush fluid, and thereafter introducing a treating fluid into said fracture, said treating fluid having a specific gravity of at least about 0.1 less than the specific gravity of said first preflush fluid and at least about 0.04 more than the specific gravity of said second preflush fluid; whereby said treating fluid is caused to override said first preflush fluid and to underride said second preflush fluid and to flow along said interface between said first preflush fluid and said second preflush fluid into a desired zone of said fracture.

9. The method of claim 8 wherein the specific gravity of said second preflush fluid in said fracture is at least about 0.05 less than the specific gravity of said first preflush fluid in said fracture.

10. The method of claim 9 which is further characterized to include the step of continuously introducing successive quantities of said first preflush fluid, said second preflush fluid and said treating fluid into said fracture so that the flow of said treating fluid along said interface is maintained while said treating fluid is flowed through said fracture.

11. The method of claim 10 wherein said first preflush fluid and said second preflush fluid are selected from the group consisting of hydrocarbon liquids, water, aqueous sodium chloride solutions, aqueous calcium chloride solutions, and aqueous potassium chloride solutions.

12. The method of claim 11 wherein said treating fluid is selected from the group consisting of hydrochloric acid, hydrochloric acid-organic acid mixtures and methanol-hydrochloric acid mixtures.

13. The method of claim 12 wherein the apparent viscosities of said first and second preflush fluids and said treating fluid at the temperature existing in said fractures are less than about 100 cps.

14. The method of claim 13 wherein said first and second preflush fluids are aqueous solutions having specific gravities in the range of from about 1 to about 1.4 at room temperature and wherein said treating fluid is an aqueous acid solution having a specific gravity in the range of from about 1.075 to about 1.15 at room temperature.

15. The method of claim 9 which is further characterized to include the initial step of inducing one or more of said fractures.

* * * * *